(12) United States Patent
Bartha et al.

(10) Patent No.: US 9,417,636 B2
(45) Date of Patent: Aug. 16, 2016

(54) PRESSURE CONTROL ASSEMBLY FOR A FLUID REGULATOR

(71) Applicant: EMERSON PROCESS MANAGEMENT REGULATOR TECHNOLOGIES, INC., McKinney, TX (US)

(72) Inventors: Istvan Bartha, Odorheiu-Secuiesc (RO); Aaron P. Oprean, Floresti (RO); Florin R. Roman, Cluj-Napoca (RO); Vlad C. Hânceanu, Apahida (RO); Silviu V. Rebreanu, Cluj-Napoca (RO)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 177 days.

(21) Appl. No.: 14/163,753

(22) Filed: Jan. 24, 2014

(65) Prior Publication Data

US 2015/0212525 A1 Jul. 30, 2015

(51) Int. Cl.
*F16K 31/12* (2006.01)
*G05D 16/06* (2006.01)

(52) U.S. Cl.
CPC .......... *G05D 16/063* (2013.01); *G05D 16/0636* (2013.01); *G05D 16/0694* (2013.01); *Y10T 137/7795* (2015.04)

(58) Field of Classification Search
CPC .............. G05D 16/185; G05D 16/063; G05D 16/0697; G05D 16/0694; G05D 16/0636; Y10T 137/782; Y10T 137/7849
See application file for complete search history.

(56) References Cited

U.S. PATENT DOCUMENTS

| 2,183,569 | A | | 12/1939 | Hughes | |
|---|---|---|---|---|---|
| 2,351,047 | A | * | 6/1944 | Hughes | G05D 16/0694 137/466 |
| 2,731,026 | A | * | 1/1956 | Hughes | G05D 16/0694 137/116.5 |
| 3,012,573 | A | | 12/1961 | Peterson | |
| 3,648,727 | A | * | 3/1972 | Huyck | G05D 16/185 137/505 |
| 2010/0147400 | A1 | * | 6/2010 | Hawkins | F16K 17/105 137/484.4 |
| 2013/0037130 | A1 | | 2/2013 | Olbrisch et al. | |
| 2013/0255791 | A1 | * | 10/2013 | Nashery | G05D 7/00 137/12 |

FOREIGN PATENT DOCUMENTS

| DE | 1912043 A1 * | 10/1969 | ......... G05D 16/0694 |
|---|---|---|---|
| DE | 8520351 U1 | 8/1985 | |
| DE | 19736578 A1 | 3/1999 | |

OTHER PUBLICATIONS

International Search Report and Written Opinion from International Application No. PCT/US2015/012806, dated Apr. 23, 2015.

* cited by examiner

*Primary Examiner* — Jessica Cahill
(74) *Attorney, Agent, or Firm* — Marshall, Gerstein & Borun LLP

(57) ABSTRACT

A pressure control assembly is provided that is coupled to a fluid regulator having a regulator body, an actuator, and an exhaust vent. The actuator includes an actuator housing, a diaphragm disposed within the actuator housing, a first chamber defined adjacent a first side of the diaphragm, and second chamber defined adjacent a second side of the diaphragm. The exhaust vent is formed in the actuator housing to fluidly couple the first chamber to the atmosphere. The pressure control assembly includes a flexible element positioned within an orifice of the exhaust vent. The flexible element is movable within the orifice in response to changes in the pressure in the second chamber.

20 Claims, 7 Drawing Sheets

PRESSURE CONTROL ASSEMBLY FOR A FLUID REGULATOR

FIELD OF THE DISCLOSURE

The present disclosure is directed to fluid regulators, and, more particularly, a pressure control assembly for a fluid regulator.

BACKGROUND

Process control systems, such as distributed or scalable process control systems commonly found in chemical, petroleum or other industrial processes, typically include one or more process controllers communicatively coupled to one or more field devices via analog, digital, or combined analog/digital buses. The field devices may include, for example, control valves (e.g., pressure regulators) valve positioners, switches, and transmitters (e.g., temperature, pressure and flow rate sensors). The field devices perform functions within the process such as opening or closing valves, measuring process parameters, and performing basic diagnostics. The process controller receives signals indicative of process measurements made by the field devices, or may receive other information pertaining to the operation or status of the field devices. The process controller then uses this information to execute or implement one or more control routines to generate control signals, which are sent over the buses to the field devices to control the operation of the process. Information from each of the field devices and the controller is typically made available to one or more applications executed by one or more other hardware devices, such as host or user workstations, personal computers or computing devices. In turn, such applications enable an operator to perform any desired function regarding the process, such as setting parameters for the process, viewing the current state of the process, modifying the operation of the process, or other desired functions.

Conventionally, control valves and pressure regulators include a pneumatic actuator. These actuators typically include a diaphragm disposed within a spring case or casing, and the casing includes a vent hole that facilitates the movement of air into and out of the casing as the diaphragm of the control valve moves in response to pressure changes in the process fluid. The vent hole thus serves to maintain the pressure on one side of the diaphragm at atmospheric pressure.

Moreover, when the control valve is installed in an internal environment (e.g., in a process control room), vent piping is fluidly coupled to the vent hole. The vent piping runs to an ambient or external environment, such as outside or another safe location. In the event that a diaphragm or some other component of the control valve fails, the vent piping can vent process gas from within the control valve to the external environment, such that the process gas is not vented into or within the internal environment and/or does not damage the control valve. However, installing and maintaining vent piping can be costly and require significant amounts of time, and vent piping, once installed, can take up significant amounts of space.

SUMMARY

In accordance with a first exemplary aspect, a fluid regulator includes a regulator body, a control element configured to control a fluid flow through the regulator body, and an actuator operatively coupled to the control element and configured to control a position of the control element. The actuator includes an actuator housing, a diaphragm disposed in the actuator housing, a first chamber defined adjacent a first side of the diaphragm, and a second chamber defined adjacent a second side of the diaphragm. An exhaust vent is formed in the actuator housing to fluidly couple the second chamber to the atmosphere. A pressure control assembly is operably coupled to the exhaust vent. The pressure control assembly includes a flexible element movable in response to changes in pressure within the second chamber.

In accordance with a second exemplary aspect, a pressure control assembly is operably coupled to a fluid regulator having a regulator body, an actuator, and an exhaust vent, the actuator including an actuator housing, a diaphragm disposed within the actuator housing, a first chamber defined adjacent a first side of the diaphragm, and a second chamber defined adjacent a second portion of the diaphragm. The diaphragm is movable within the actuator housing in response to pressure changes at an inlet or an outlet of the regulator body. The exhaust vent is formed in the actuator housing and configured to fluidly couple the second chamber to the atmosphere. The pressure control assembly includes a flexible element positioned within an orifice of the exhaust vent. The flexible element is movable within the orifice in response to movement of the diaphragm.

In accordance with a third exemplary aspect, a fluid regulator includes a regulator body that defines a fluid inlet, a fluid outlet, and a fluid flow path therebetween, a control element configured to control a fluid flow through the regulator body, and an actuator operatively coupled to the control element and configured to control a position of the control element. The actuator includes an actuator housing, a diaphragm disposed within the actuator housing and movable within the actuator housing in response to pressure changes at the fluid inlet or the fluid outlet, a first chamber defined adjacent a first side of the diaphragm, and a second chamber defined adjacent a second side of the diaphragm. An exhaust vent is formed in the actuator housing to fluidly couple the second chamber to the atmosphere. A pressure control assembly is operably coupled to the exhaust vent. The pressure control assembly includes a spacer, a barrier, a plug, and a flexible element. The spacer is arranged within the orifice of the exhaust vent. The barrier is positioned adjacent to the spacer within the orifice. The plug has a first annular portion and a second annular portion, the first annular portion being coupled to the actuator housing outside of the exhaust vent, and the second annular portion positioned adjacent to the barrier within the orifice of the exhaust vent. The flexible element is coupled to the spacer and configured to move in response to movement of the diaphragm.

In further accordance with any one or more of the foregoing first, second, or third exemplary aspects, a fluid regulator and/or pressure control assembly may include any one or more of the following further preferred forms.

In one preferred form, the regulator body defines a fluid inlet, a fluid outlet, and a fluid flow path therebetween. The diaphragm is movable in response to pressure changes at the fluid inlet or the fluid outlet. The flexible element is movable in response to movement of the diaphragm.

In another preferred form, when the diaphragm moves toward the second chamber, the flexible element is configured to move outward to an expanded position to increase a volume of the second chamber.

In another preferred form, when the diaphragm moves away from the second chamber, the flexible element is configured to move inward to a retracted position to decrease a volume of the second chamber.

In another preferred form, the actuator housing is formed of a first casing and a second casing, and the exhaust vent is formed in the second casing.

In another preferred form, the flexible element is configured to move outward to a sealing position such that fluid flowing in the regulator body is sealingly contained within the second chamber.

In another preferred form, the flexible element is configured to move outward to a sealing position against a portion of the pressure control assembly such that fluid flowing in the regulator body does not exhaust through the exhaust vent.

In another preferred form, the fluid regulator does not include vent piping coupled to the exhaust vent.

In another preferred form, the flexible element includes a flexible membrane.

In another preferred form, the pressure control assembly includes a spacer, a barrier, and a plug. The spacer is arranged within the orifice of the exhaust vent. The barrier is positioned adjacent to the spacer within the orifice. The plug has a first annular portion and a second annular portion. The first annular portion is coupled to the actuator housing outside of the exhaust vent. The second annular portion is positioned adjacent to the barrier within the orifice of the exhaust vent. The flexible element is movably coupled to the spacer within the orifice of the exhaust vent.

In another preferred form, the flexible element is configured to move outward against a barrier such that the fluid flowing in the regulator body does not exhaust through the exhaust vent.

In another preferred form, the flexible element includes a flexible membrane that has a circumferential edge and a flexible body disposed therebetween, the circumferential edge being fixed to a spacer.

In another preferred form, a barrier includes a mesh screen having a top surface, a bottom surface, and a plurality of holes that extend through the top and bottom surfaces. The top surface is in contact with the second annular portion of the plug. The bottom surface is in contact with the spacer. The plurality of holes are in fluid communication with the orifice of the exhaust vent.

In another preferred form, when the diaphragm moves toward the second chamber, the flexible element is configured to move toward a barrier to an expanded position to increase a volume of the second chamber.

In another preferred form, when the diaphragm moves away from the second chamber, the flexible element is configured to move away from a barrier to a retracted position to increase a volume of the second chamber.

In another preferred form, the flexible element is configured to move toward and contact a barrier such that fluid flowing in the regulator body does not exhaust through the exhaust vent to the atmosphere.

DETAILED DESCRIPTION

The present disclosure is directed to a pressure control assembly that is operably coupled to an exhaust vent of a fluid regulator. The pressure control assembly disclosed herein includes a flexible element that is configured to move to maintain a pre-determined pressure within a chamber of the fluid regulator in communication with the exhaust vent. Additionally, the flexible element is configured to separate or seal a spring case of the fluid regulator from the environment in which the fluid regulator is installed. The flexible element thus obviates the need for conventional piping, which can be costly and time-consuming to install and maintain and can require significant amounts of space once installed.

Figure 1:
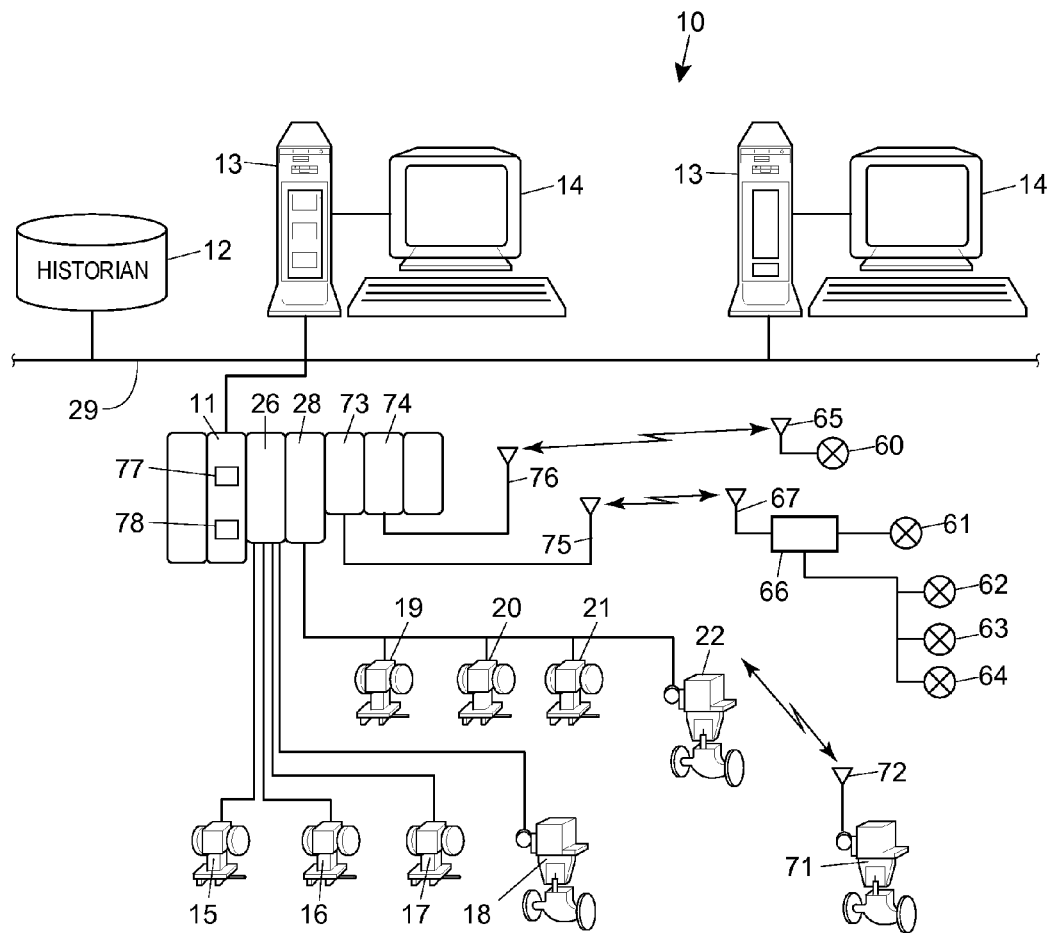
FIG. 1 is a schematic representation of a process control system having one or more field devices constructed in accordance with the principles of the present invention.

Referring now to FIG. 1, a process control system 10 constructed in accordance with one version of the present disclosure is depicted incorporating one or more field devices 15, 16, 17, 18, 19, 20, 21, 22, and 71 in communication with a process controller 11, which in turn, is in communication with a data historian 12 and one or more user workstations 13, each having a display screen 14. So configured, the controller 11 delivers signals to and receives signals from the field devices 15, 16, 17, 18, 19, 20, 21, 22, and 71 and the workstations 13 to control the process control system.

In additional detail, the process controller 11 of the process control system 10 of the version depicted in FIG. 1 is connected via hardwired communication connections to field devices 15, 16, 17, 18, 19, 20, 21, and 22 via input/output (I/O) cards 26 and 28. The data historian 12 may be any desired type of data collection unit having any desired type of memory and any desired or known software, hardware or firmware for storing data. Moreover, while the data historian 12 is illustrated as a separate device in FIG. 1, it may instead or in addition be part of one of the workstations 13 or another computer device, such as a server. The controller 11, which may be, by way of example, a DeltaV™ controller sold by Emerson Process Management, is communicatively connected to the workstations 13 and to the data historian 12 via a communication network 29 which may be, for example, an Ethernet connection.

As mentioned, the controller 11 is illustrated as being communicatively connected to the field devices 15, 16, 17, 18, 19, 20, 21, and 22 using a hardwired communication scheme which may include the use of any desired hardware, software and/or firmware to implement hardwired communications, including, for example, standard 4-20 mA communications, and/or any communications using any smart communication protocol such as the FOUNDATION® Fieldbus communication protocol, the HART® communication protocol, etc. The field devices 15, 16, 17, 18, 19, 20, 21, and 22 may be any types of devices, such as sensors, control valve assemblies (e.g., fluid regulators), transmitters, positioners, etc., while the I/O cards 26 and 28 may be any types of I/O devices conforming to any desired communication or controller protocol. In the embodiment illustrated in FIG. 1, the field devices 15, 16, 17, 18 are standard 4-20 mA devices that communicate over analog lines to the I/O card 26, while the digital field devices 19, 20, 21, 22 can be smart devices, such as HART® communicating devices and Fieldbus field devices, that communicate over a digital bus to the I/O card 28 using Fieldbus protocol communications. Of course, the field devices 15, 16, 17, 18, 19, 20, 21, and 22 may conform to any other desired standard(s) or protocols, including any standards or protocols developed in the future.

In addition, the process control system 10 depicted in FIG. 1 includes a number of wireless field devices 60, 61, 62, 63, 64 and 71 disposed in the plant to be controlled. The field devices 60, 61, 62, 63, 64 are depicted as transmitters (e.g., process variable sensors) while the field device 71 is depicted as a control valve assembly including, for example, a fluid regulator. Wireless communications may be established between the controller 11 and the field devices 60, 61, 62, 63, 64 and 71 using any desired wireless communication equipment, including hardware, software, firmware, or any combination thereof now known or later developed. In the version illustrated in FIG. 1, an antenna 65 is coupled to and is dedicated to perform wireless communications for the transmitter 60, while a wireless router or other module 66 having an antenna 67 is coupled to collectively handle wireless communications for the transmitters 61, 62, 63, and 64. Likewise, an antenna 72 is coupled to the control valve assembly 71 to perform wireless communications for the control valve assembly 71. The field devices or associated hardware 60, 61, 62, 63, 64, 66 and 71 may implement protocol stack operations used by an appropriate wireless communication protocol to receive, decode, route, encode and send wireless signals via the antennas 65, 67 and 72 to implement wireless communications between the process controller 11 and the transmitters 60, 61, 62, 63, 64 and the control valve assembly 71.

If desired, the transmitters 60, 61, 62, 63, 64 can constitute the sole link between various process sensors (transmitters) and the process controller 11 and, as such, are relied upon to send accurate signals to the controller 11 to ensure that process performance is not compromised. The transmitters 60, 61, 62, 63, 64, often referred to as process variable transmitters (PVTs), therefore may play a significant role in the control of the overall control process. Additionally, the control valve assembly 71 may provide measurements made by sensors within the control valve assembly 71 or may provide other data generated by or computed by the control valve assembly 71 to the controller 11 as part of its operation. Of course, as is known, the control valve assembly 71 may also receive control signals from the controller 11 to effect physical parameters, e.g., flow, within the overall process.

The process controller 11 is coupled to one or more I/O devices 73 and 74, each connected to a respective antenna 75 and 76, and these I/O devices and antennas 73, 74, 75, 76 operate as transmitters/receivers to perform wireless communications with the wireless field devices 61, 62, 63, 64 and 71 via one or more wireless communication networks. The wireless communications between the field devices (e.g., the transmitters 60, 61, 62, 63, 64 and the control valve assembly 71) may be performed using one or more known wireless communication protocols, such as the WirelessHART® protocol, the Ember protocol, a WiFi protocol, an IEEE wireless standard, etc. Still further, the I/O devices 73 and 74 may implement protocol stack operations used by these communication protocols to receive, decode, route, encode and send wireless signals via the antennas 75 and 76 to implement wireless communications between the controller 11 and the transmitters 60, 61, 62, 63, 64 and the control valve assembly 71.

As illustrated in FIG. 1, the controller 11 conventionally includes a processor 77 that implements or oversees one or more process control routines (or any module, block, or sub-routine thereof) stored in a memory 78. The process control routines stored in the memory 78 may include or be associated with control loops being implemented within the process plant. Generally speaking, and as is generally known, the process controller 11 executes one or more control routines and communicates with the field devices 15, 16, 17, 18, 19, 20, 21, 22, 60, 61, 62, 63, 64, and 71, the user workstations 13 and the data historian 12 to control a process in any desired manner(s). Additionally, any one of the field devices 18, 22, and 71 in FIG. 1, each of which is depicted as a control valve assembly, can include an intelligent control valve actuator constructed in accordance with the principles of the present disclosure for communicating with the process controller 11 in order to facilitate monitoring of the actuator's health and integrity.

Figure 2:
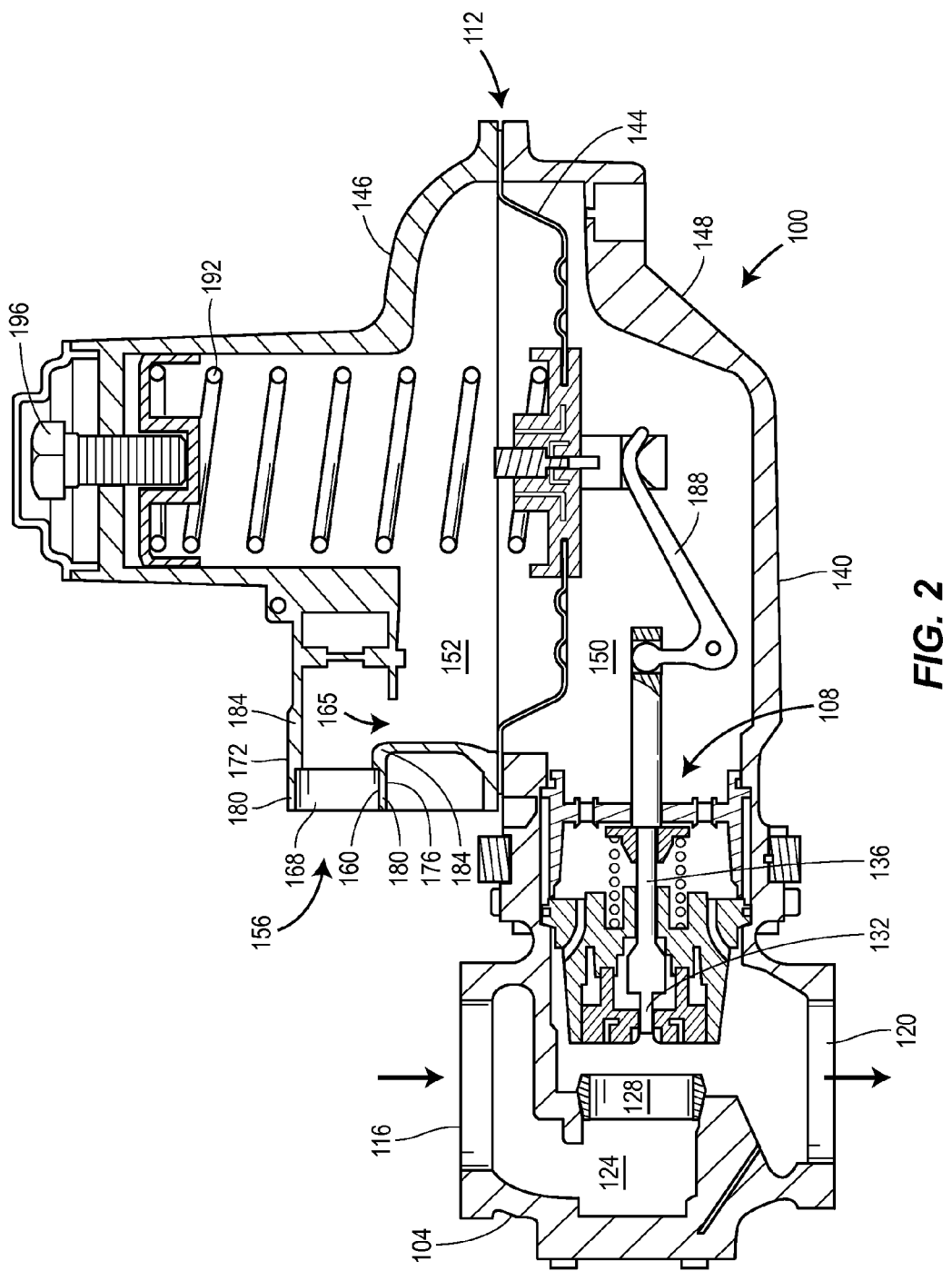
FIG. 2 depicts one example of a field device constructed in accordance with the principles of the present invention.

Referring now to FIG. 2, for the sake of description, the field device 71 from FIG. 1 is shown as a control valve assembly 100 constructed in accordance with the present disclosure. The control valve assembly 100 described herein is installed within, at, or in an internal environment (e.g., in a process control room), but it need not be. For example, the control valve assembly 100 can be installed in an external environment (e.g., outdoors).

In this example, the control valve assembly 100 is a process fluid regulator that includes a regulator body 104, a control element 108, and an actuator assembly 112. In other examples, the control valve assembly 100 can be a different type of process control device and/or include different and/or additional components.

The regulator body 104 defines a fluid inlet 116, a fluid outlet 120, a fluid flow path 124, and an orifice 128. The fluid flow path 124 extends between the fluid inlet 116 and the fluid outlet 120. The orifice 128 is operatively disposed between the fluid inlet 120 and the fluid outlet 124. The control element 108 is disposed for displacement in the regulator body 104 for controlling the flow of fluid therethrough. The control element 108 includes a valve plug or valve disk 132 connected to a valve stem 136.

The actuator assembly 112 is operatively connected to the regulator body 104 to control the position of the control element 108 relative to the orifice 128. The actuator assembly 112 includes a housing 140, a diaphragm 144 disposed within the housing 140, and a linkage operatively connecting the diaphragm 144 to the control element 108. The actuator housing 140 is formed of a first or spring case 146 and a second or diaphragm case 148 secured together, such as with one or more bolts connecting respective outer flanges of the first and second cases 146, 148. The diaphragm 144 separates the housing 140 into a first chamber 150 and a second chamber 152. The first chamber 150 is defined at least partly by one side of the diaphragm 144 and the diaphragm case 148. The second chamber 152 is defined at least partly by the other side of the diaphragm 144 and the spring case 146.

An exhaust vent 156 is formed in the spring case 146 of the housing 140 and extends into the second chamber 152. The exhaust vent 156 includes an orifice 160 that extends from an inlet 164 to an outlet 168. The orifice 160 is defined by a first wall 172 that forms or defines part of the outer surface of the spring case 146 and a second wall 176, opposite the first wall 172, that forms or defines a different part of the outer surface of the spring case 146. The first and second walls 172, 176 each have a first wall portion or section 180 that transitions into a second wall portion or section 184. Each second wall portion 184 has a width that is greater than a width of each first wall portion 180, such that the orifice 160 is wider between the first wall portions 180 than between the second wall portions 184. The outlet 168 is in fluid communication with the surrounding ambient atmosphere and the inlet 164 is in fluid communication with the second chamber 152, such that the exhaust vent 156 fluidly connects the second chamber 152 to the surrounding ambient atmosphere. In turn, the second chamber 152 can be maintained at a pressure that is approximately equal to the pressure of the surrounding ambient atmosphere.

The linkage includes a lever 188 that has a first end operatively connected to the diaphragm 144 and a second end operatively connected to the valve stem 136. Movement of the diaphragm 144 in response to pressure changes at the outlet 120 causes the linkage to shift the control element 108 in a manner so as to maintain the process fluid pressure within a pre-selected range at the fluid outlet 120. The actuator assembly 112 further includes a control spring 192 operatively connected to the diaphragm 144. The spring 192 is arranged to bias the diaphragm 144 against the fluid pressure with a selected force so as to maintain the pre-selected pressure range at the fluid outlet 120. The force exerted by the control spring 192 can be adjusted via an adjusting screw 196.

In other embodiments, the regulator body 104, the control element 108, the actuator assembly 112, or combinations thereof can vary from what is depicted herein and yet still perform the intended functionality. In some embodiments, the shape, size, and/or configuration of the fluid inlet 116, the fluid outlet 120, the fluid flow path 124, and/or the orifice 128 can vary from what is depicted in FIG. 2. In some embodiments, the shape, size, and/or configuration of the actuator housing 140, particularly the first case 146 and the diaphragm case 148, can vary from what is depicted in FIG. 2. Moreover, the shape, size, and/or components of the exhaust vent 156 can vary from what is depicted in FIG. 2. For example, the orifice 160 can have a different size and/or shape (e.g., it can be defined by different sized and/or shaped components). As another example, the first and second walls 172, 176 may only include one wall portion 180 or 184, rather than the first and second wall portions 180, 184.

With the control valve assembly 100 configured as described, the diaphragm-based actuator 112 serves to position the valve plug 132 of the control element 108 relative to the flow path 124 to satisfy desired process control parameters (e.g., a desired set-point pressure). The spring 192 of the actuator assembly 112 naturally biases the diaphragm 144 downward relative to the orientation of FIG. 2, which translates into a movement of the control element 108 toward an open position. In order to move the control element 108 toward a closed position, a pneumatic signal can be supplied to the first chamber 150 to increase the pressure in the first chamber 150. The pneumatic signal can, for example, be supplied in response to or based on a pressure at the inlet 120 or at the outlet 124, detected by a feedback pressure sensor, that is less than the desired set-point pressure. In any event, this increase in pressure is sensed by the diaphragm 144 and ultimately overcomes the force applied by the spring 192, thereby moving the diaphragm 144 in the upward direction and moving the lever 188, the valve stem 136 and, in turn, the valve plug 132 toward the closed position. When the pneumatic signal supplied to the first chamber 150 is reduced and/or eliminated, the spring 192 can expand and urge the diaphragm 144 downward and, in turn, the lever 188, the valve stem 136, and the valve plug 132 back toward the open position.

As noted above, conventionally, the orifice 160 of the exhaust vent 156 would be used to facilitate the movement of air into and out of the exhaust vent 156 and, thus, the second chamber 152 in an attempt to maintain a pressure inside the second chamber 152 at atmospheric pressure. In addition, vent piping would, conventionally, be fluidly coupled to the exhaust vent 156 of the control valve assembly 100. The vent piping would run or connect to an external or ambient environment (e.g., outside, a safe location) away from the control valve assembly 100, and in the event that the diaphragm 144 or some other component of the valve assembly 100 was to fail, the vent piping could safely transport or vent process fluid from within the valve assembly 100, particularly the regulator body 104, to the external environment. Without this vent piping, the process fluid would, undesirably, be vented into an environment in or at which the control valve assembly 100 is installed.

Such vent piping can, however, be costly and time-consuming to install and maintain and require significant amounts of space once installed. Accordingly, the present disclosure describes a pressure control assembly that obviates the need for external vent piping. The pressure control assembly disclosed herein is operably coupled to the exhaust vent 156 and can maintain a pre-determined pressure within the second chamber 152 and serve to separate or seal the spring case 146 from the environment in or at which the control valve assembly 100 is installed, thereby eliminating the need for the conventional vent piping described above.

Figure 3:
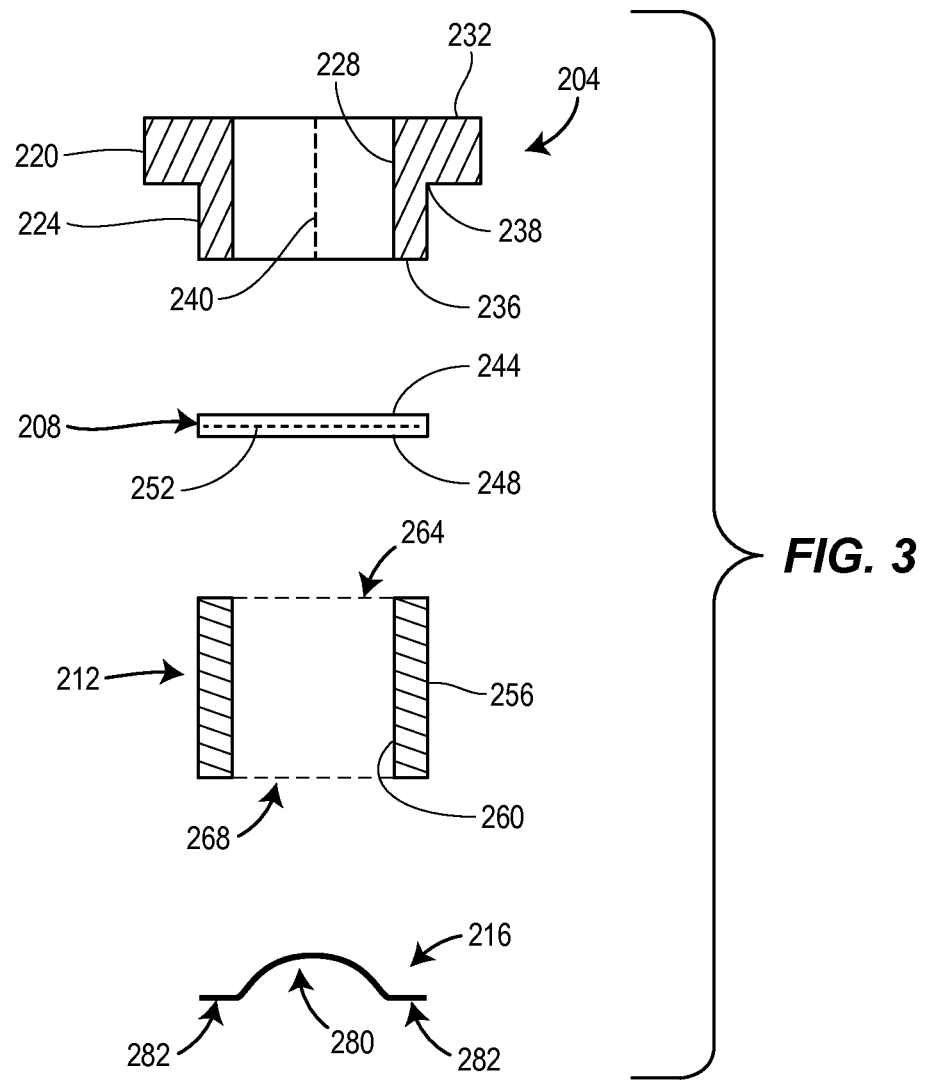
FIG. 3 is an exploded cross-sectional view of a pressure control assembly for use with the field device of FIG. 2.

FIG. 3 depicts an exemplary pressure control assembly 200 constructed in accordance with the present disclosure. The pressure control assembly 200 includes a plug 204, a barrier 208, a seat or spacer 212, and a flexible element 216. In other examples, the pressure control assembly 200 can include additional, different, or fewer components. For example, the shape and/or size of the plug 204, the barrier 208, the spacer 212, and/or the flexible element 216 can vary from what is depicted in FIG. 3. As another example, the plug 204 may take any other suitable form, such as, for example, a disc.

As shown in FIG. 3, the plug 204 has a first annular portion 220, a second annular portion 224, and an orifice 228. The first annular portion 220 defines a top surface 232 of the plug 204, and the second annular portion 224 defines a bottom surface 236 of the plug 204. The first annular portion 220 has an outer diameter that is larger than the outer diameter of the second annular portion 224, such that the top surface 232 has a larger outer diameter than the bottom surface 236. The first annular portion 220 transitions to the second annular portion 224 (and vice-versa) at or via a shoulder 238. The orifice 228 extends through the first and second annular portions 220, 224 between the top and bottom surfaces 232, 236, and is oriented along an axis 240 of the plug 204, as shown in FIG. 3.

The barrier 208 has a generally annular shape and an outer diameter that is approximately equal to the outer diameter of the second annular portion 224. The barrier 208 shown in FIG. 3 is a mesh screen, such as a wire mesh screen (e.g., a stainless steel screen, a copper screen, a brass screen, a bronze screen, aluminum screen, etc.) or some other type of screen. As such, the barrier 208 shown in FIG. 3 has a relatively thin profile and defines a top surface 244, a bottom surface 248, and a plurality of small holes 252 that extend through the top surface 244 and the bottom surface 248. In other examples, the barrier 208 can be a wall, a porous disc or cylinder, or some other type of divider or barrier. As such, the barrier 208 can have a different profile and/or need not include the holes 252.

The seat or spacer 212 is a cylindrically shaped body defined by a circumferential wall 256 and an orifice 260 that extends through or within the wall 256. The circumferential wall 256 defines a top surface 264 and a bottom surface 268. The circumferential wall 256 has an outer diameter that is approximately equal to the outer diameter of the second annular portion 224, and the diameter of the orifice 260 is approximately equal to the diameter of the orifice 228 (i.e., the inner diameter of the wall 256 is approximately equal to the inner diameter of the second annular portion 224).

The flexible element 216 depicted in FIG. 3 has a flexible body 280 and a circumferential edge 282 surrounding the flexible body 280. The flexible element 216 is a flexible membrane, such as a ceramic membrane (e.g., made from inorganic materials), a polymeric membrane (e.g., made from cellulose acetate, Nitrocellulose, polyethylene, polypropylene, polyamide, etc.), or some other type of membrane. The flexible membrane can have pores of any size (e.g., a pore diameter of less than 2 nm, a pore diameter between 2 nm and 50 nm, or a pore diameter of greater than 50 nm). In other examples, the flexible element can be a diaphragm or some other type of flexible element (e.g., made from a flexible material such as rubber, plastic, etc.).

Figure 4:
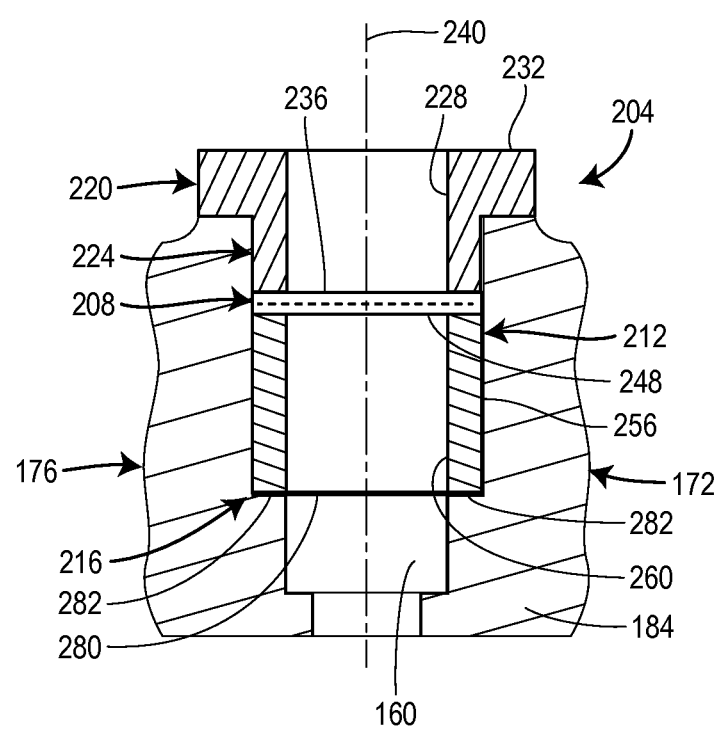
FIG. 4 is a cross-sectional view of the pressure control assembly of FIG. 3 coupled to the field device of FIG. 2.

FIG. 4 depicts the pressure control assembly 200 as assembled and used or employed in connection with the control valve assembly 100. As briefly described above, the pressure control assembly 200 is generally coupled to the exhaust vent 156. More specifically, the plug 204, the barrier 208, the spacer 212, and the flexible element 216 are coupled to or within the orifice 160 of the exhaust vent 156. As shown in FIG. 4, the spacer 212 is disposed or seated within the orifice 160 such that the wall 256 is adjacent (e.g., contacts or engages) the first wall portion 180 of the first and second walls 172, 176, the bottom surface 268 is adjacent (e.g., contacts or engages) the second wall portion 184 of the first and second walls 172, 176, and the orifice 260 is aligned (e.g., co-axial) with the orifice 160 of the exhaust vent 156. The flexible element 216 is coupled to the spacer 208 by, for example, securing (e.g., affixing, adhering) the circumferential edge 282 of the flexible element 216 to the bottom surface 268 of the spacer 212. The flexible body 280, which extends between the circumferential edge 282, is disposed and movable, relative to the spacer 212, within the orifice 160, as will be described in greater detail below.

As shown in FIG. 4, the barrier 208 is disposed within the orifice 160 adjacent (e.g., on) the spacer 212. More specifically, the bottom surface 248 of the barrier 208 is seated against or along the top surface 264 of the spacer 212. As such, the plurality of holes 252 are positioned or arranged within the orifice 260 of the spacer 212. As shown in FIG. 4, the plug 204 is at least partially disposed within the orifice 160. Specifically, the bottom surface 236 of the plug 204 is seated adjacent or against the top surface 244 of the barrier 208 and the second annular portion 224 of the plug 204 is adjacent (e.g., contacts or engages) the first wall portion 180 of the first and second walls 172, 176. The shoulder 238 of the plug 204 is adjacent to (e.g., engages or contacts) an outermost portion of the first wall portion 180 of the first and second walls 172, 176. The first annular portion 220 of the plug 204 is disposed or seated outside of (i.e., not within) the orifice 160. As shown in FIG. 4, a portion of the first annular portion 220 overlies part of the first wall portion 180 of each of the first and second walls 172, 176. This overlying portion serves to retain the plug 204 in the described configuration. Like the orifice 260, the orifice 228 is aligned (e.g., co-axial) with the orifice 160. In turn, the plurality of holes 252 are in fluid communication with the orifices 228, 260, and 160.

In other examples, the plug 204, the barrier 208, the spacer 212, the flexible component 216, and/or components thereof, can be arranged differently than what is depicted in FIG. 4. One of ordinary skill in the art will also appreciate that the pressure control assembly 200 can be used in connection with control valve assemblies other than the control valve assembly 100. For example, the pressure control assembly 200 can be used in connection with other regulator bodies, control elements, actuator assemblies, components thereof, or combinations thereof.

Figure 5:
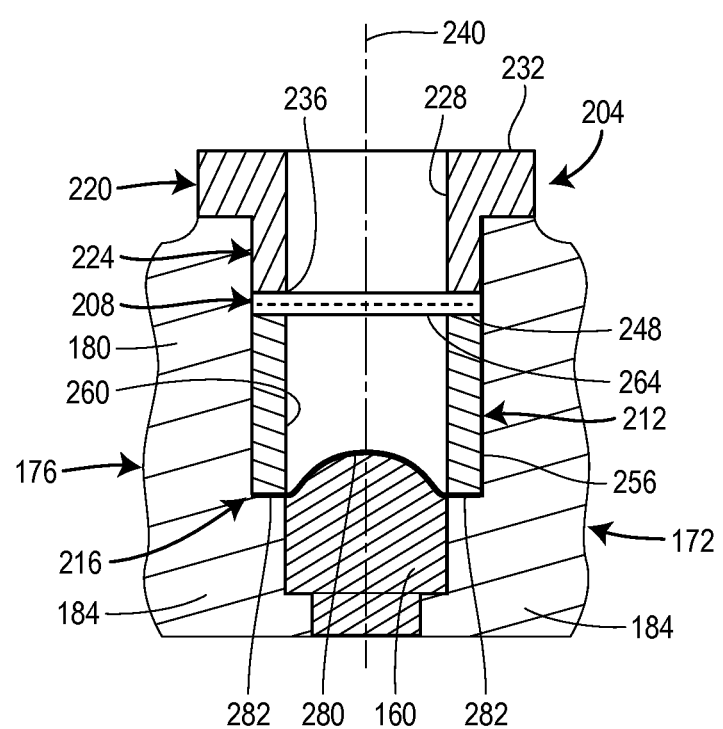
FIG. 5 is similar to FIG. 4, but illustrates a flexible element of the pressure control assembly in an expanded position.
Figure 6:
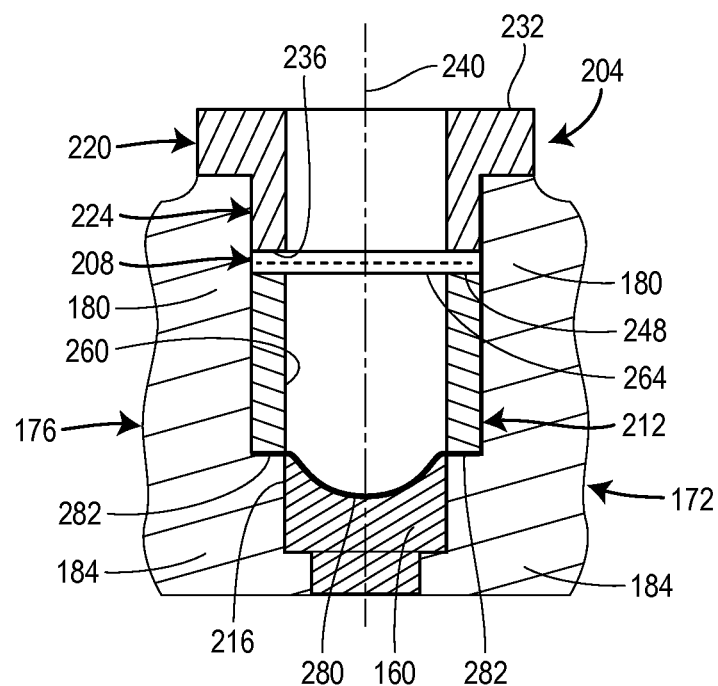
FIG. 6 is similar to FIG. 4, but illustrates the flexible element of the pressure control assembly in a retracted position.
Figure 7:
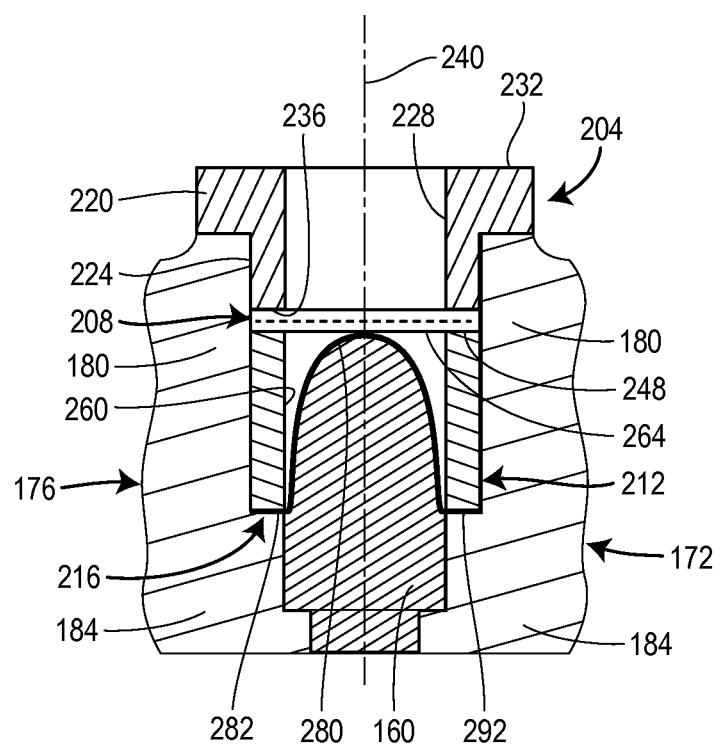
FIG. 7 is similar to FIG. 4, but illustrates the flexible element of the pressure control assembly in a sealing position.

With the pressure control assembly 200 arranged as described, the pressure control assembly 200 is configured to maintain a pre-determined pressure within the second chamber 152 and separate and effectively seal the spring case 146 from the environment in at or which the control valve assembly 100 is installed. FIGS. 5-7 will be used to describe how the operation of the pressure control assembly 200 can achieve one or both of these functions.

With reference again to FIG. 4, the flexible element 216 is shown in its original position with the first chamber 152 at a pre-determined pressure. The flexible element 216 is, however, movable within the orifice 160 (and the orifice 260, which is aligned with the orifice 160) based on or in response to movement by the diaphragm 144 in order to maintain the pre-determined pressure within the second chamber 152. The pre-determined pressure can be substantially equal to the pressure of the external environment or can be some other pressure.

When a pneumatic signal is supplied to the first chamber 150 to increase the pressure in the first chamber 150, the diaphragm 144 is, as described above in connection with FIG. 2, moved upward. This, in turn, reduces the total effective volume of the second chamber 152, which would normally increase the pressure in the second chamber 152. To prevent this, and substantially maintain the pressure in the second chamber 152 at the pre-determined pressure, the flexible element 216 is configured to move outward or toward the barrier 208 to an expanded position, as shown in FIG. 5. More specifically, the body 280 of the flexible element 216 is moved or pushed outward or toward, but does not contact or touch, the barrier 208. This movement offsets the loss of volume due to the upward movement of the diaphragm 144, such that the volume of the second chamber 152 remains substantially equal to the volume of the chamber 152 before movement of the diaphragm 144, thereby substantially maintaining the pressure in the second chamber 152 at the pre-determined pressure.

When the pneumatic signal supplied to the first chamber 150 is reduced or eliminated, the spring 192 can, as described above in connection with FIG. 2, expand and urge the diaphragm 144 downward. This, in turn, increases the total effective volume of the second chamber 152, which would normally decrease the pressure in the second chamber 152. To prevent this, and substantially maintain the pressure in the second chamber 152 at the pre-determined pressure, the flexible element 216 is configured to move inward or away from the barrier 208 to a retracted position, as shown in FIG. 6. More specifically, the body 280 of the flexible element 216 is moved or pushed inward or away from the barrier 208. This movement offsets the volume increase due to the downward movement of the diaphragm 144, such that the volume of the second chamber 152 remains substantially equal to the volume of the chamber 152 before movement of the diaphragm 144, thereby substantially maintaining the pressure in the second chamber 152 at the pre-determined pressure.

When, however, a component of the control valve assembly 100 fails or is otherwise not working properly, the pressure control assembly 200 can effectively seal the spring case 146 from the environment in or at which the control valve assembly 100 is installed, thereby preventing process fluid from the control valve assembly 100 from being vented to this environment. When, for example, the diaphragm 144 fails or is otherwise not working properly, the pressure in the spring case 146 increases, and, in turn, the flexible element 216 is configured to move outwards or towards the barrier 208 until at least a portion of the flexible element 216 contacts or is disposed against the barrier 208, as shown in FIG. 7. In this position, the flexible element 216 effectively seals the exhaust vent 156, and, thus, prevents any process fluid from escaping the control valve assembly 100 and being vented to or into the environment in or at which the control valve assembly 100 is installed.

In other examples, the extent of the movement of the flexible element 216 can vary depending upon the extent of the movement of the diaphragm 144. For example, the greater the magnitude of the movement of the flexible element 216, the greater the magnitude of the movement of the flexible element 216.

Based on the foregoing description, it should be appreciated that the devices, systems, and methods described herein can maintain a pre-determined pressure within a chamber of a fluid regulator and can separate or seal a spring case of the fluid regulator from the environment in which the fluid regulator is installed. In doing so, the present disclosure obviates the need for external vent piping, which is normally coupled to the exhaust vent and which can be costly and time-consuming to install and maintain and can require significant amounts of space once installed.

The invention claimed is:

1. A fluid regulator, comprising:
a regulator body;
a control element configured to control a fluid flow through the regulator body;
an actuator operatively coupled to the control element and configured to control a position of the control element, the actuator comprising:
an actuator housing;
a diaphragm disposed in the actuator housing;
a first chamber defined adjacent a first side of the diaphragm; and
a second chamber defined adjacent a second side of the diaphragm;
an exhaust vent formed in the actuator housing to fluidly couple the second chamber to the atmosphere; and
a pressure control assembly operably coupled to the exhaust vent, the pressure control assembly comprising a spacer arranged within an orifice of the exhaust vent and a flexible element position within the orifice and having an edge secured to a surface of the spacer, the flexible element movable, relative to the spacer, in response to changes in pressure within the second chamber,
wherein in response to movement of the diaphragm in a first direction, the flexible element moves in a second direction different from the first direction to increase or decrease a volume of the second chamber.

2. The fluid regulator of claim 1, wherein the regulator body defines a fluid inlet, a fluid outlet, and a fluid flow path therebetween, and wherein the diaphragm is movable in response to pressure changes at the fluid inlet or the fluid outlet.

3. The fluid regulator of claim 1, wherein when the diaphragm moves toward the second chamber, the flexible element is configured to move outward to an expanded position to increase the volume of the second chamber.

4. The fluid regulator of claim 1, wherein when the diaphragm moves away from the second chamber, the flexible element is configured to move inward to a retracted position to decrease the volume of the second chamber.

5. The fluid regulator of claim 1, wherein the actuator housing is formed of a first casing and a second casing, the exhaust vent being formed in the second casing.

6. The fluid regulator of claim 1, wherein the flexible element is configured to move outward to a sealing position such that fluid flowing in the regulator body is sealingly contained within the second chamber.

7. The fluid regulator of claim 1, wherein the flexible element is configured to move outward to a sealing position against a portion of the pressure control assembly such that fluid flowing in the regulator body does not exhaust through the exhaust vent.

8. The fluid regulator of claim 1, wherein the exhaust vent is in direct communication with the ambient environment.

9. The fluid regulator of claim 1, wherein the flexible element comprises a flexible membrane.

10. A pressure control assembly adapted to be operably coupled to a fluid regulator having a regulator body, an actuator, and an exhaust vent, the actuator including an actuator housing, a diaphragm disposed within the actuator housing, a first chamber defined adjacent a first side of the diaphragm, and a second chamber adjacent a second side of the diaphragm, the diaphragm being movable within the actuator housing in response to pressure changes at an inlet or an outlet of the regulator body, and the exhaust vent being formed in the actuator housing and configured to fluidly couple the second chamber to the atmosphere, the pressure control assembly comprising:
a spacer adapted to be arranged within an orifice of the exhaust vent; and
a flexible element adapted to be positioned within the orifice of the exhaust vent and having an edge secured to the spacer, the flexible element movable within the orifice, relative to the spacer, in response to movement of the diaphragm, wherein in response to movement of the diaphragm in a first direction, the flexible element moves in a second direction different from the first direction.

11. The pressure control assembly of claim 10, wherein when the diaphragm moves toward the second chamber, the flexible element is configured to move to an expanded position to increase a volume of the second chamber.

12. The pressure control assembly of claim 10, wherein when the diaphragm moves away from the second chamber, the flexible element is configured to move to a retracted position to decrease a volume of the second chamber.

13. The pressure control assembly of claim 10, further comprising:
a barrier adapted to be positioned adjacent to the spacer within the orifice; and
a plug having a first annular portion and a second annular portion, the first annular portion adapted to be coupled to the actuator housing outside of the exhaust vent, and the second annular portion adapted to be positioned adjacent to the barrier within the orifice of the exhaust vent.

14. The pressure assembly of claim 13, wherein the flexible element is configured to move outward against the barrier such that the fluid flowing in the regulator body does not exhaust through the exhaust vent.

15. A pressure assembly operably coupled to a fluid regulator having a regulator body, an actuator, and an exhaust vent, the actuator including an actuator housing, a diaphragm disposed within the actuator housing, a first chamber defined adjacent a first side of the diaphragm, and a second chamber adjacent a second side of the diaphragm, the diaphragm being movable within the actuator housing in response to pressure changes at an inlet or an outlet of the regulator body, and the exhaust vent being formed in the actuator housing and configured to fluidly couple the second chamber to the atmosphere, the pressure assembly comprising:
- a flexible element positioned within an orifice of the exhaust vent, the flexible element movable within the orifice in response to movement of the diaphragm,
- a spacer arranged within the orifice of the exhaust vent;
- a barrier positioned adjacent to the spacer within the orifice; and
- a plug having a first annular portion and a second annular portion, the first annular portion being coupled to the actuator housing outside of the exhaust vent, and the second annular portion positioned adjacent to the barrier within the orifice of the exhaust vent,
- wherein the flexible element is movably coupled to the spacer within the orifice of the exhaust vent, and
- wherein the flexible element comprises a flexible membrane having a circumferential edge and a flexible body disposed therebetween, the circumferential edge being fixed to the spacer.

16. A pressure assembly operably coupled to a fluid regulator having a regulator body, an actuator, and an exhaust vent, the actuator including an actuator housing, a diaphragm disposed within the actuator housing, a first chamber defined adjacent a first side of the diaphragm, and a second chamber adjacent a second side of the diaphragm, the diaphragm being movable within the actuator housing in response to pressure changes at an inlet or an outlet of the regulator body, and the exhaust vent being formed in the actuator housing and configured to fluidly couple the second chamber to the atmosphere, the pressure assembly comprising:
- a flexible element positioned within an orifice of the exhaust vent, the flexible element movable within the orifice in response to movement of the diaphragm,
- a spacer arranged within the orifice of the exhaust vent;
- a barrier positioned adjacent to the spacer within the orifice; and
- a plug having a first annular portion and a second annular portion, the first annular portion being coupled to the actuator housing outside of the exhaust vent, and the second annular portion positioned adjacent to the barrier within the orifice of the exhaust vent,
- wherein the flexible element is movably coupled to the spacer within the orifice of the exhaust vent, and
- wherein the barrier comprises a mesh screen having a top surface, a bottom surface, and a plurality of holes that extend through the top and bottom surfaces, the top surface being in contact with the second annular portion of the plug, the bottom surface being in contact with the spacer, and the plurality of holes being in fluid communication with the orifice of the exhaust vent.

17. A fluid regulator, comprising:
- a regulator body defining a fluid inlet, a fluid outlet, and a fluid flow path therebetween;
- a control element configured to control a fluid flow through the regulator body;
- an actuator operatively coupled to the control element and configured to control a position of the control element, the actuator comprising:
  - an actuator housing;
  - a diaphragm disposed within the actuator housing and movable within the actuator housing in response to pressure changes at the fluid inlet or the fluid outlet;
  - a first chamber defined adjacent a first side of the diaphragm; and
  - a second chamber defined adjacent a second side of the diaphragm;
- an exhaust vent formed in the actuator housing to fluidly couple the second chamber to the atmosphere; and
- a pressure control assembly operably coupled to the exhaust vent, the pressure control assembly comprising:
  - a spacer arranged within an orifice of the exhaust vent;
  - a plug having a first annular portion and a second annular portion, the first annular portion being coupled to the actuator housing outside of the exhaust vent, and the second annular portion within the orifice of the exhaust vent;
  - a barrier arranged between the second annular portion of the plug and the spacer within the orifice; and
  - a flexible element coupled to the spacer and configured to move to in response to movement of the diaphragm.

18. The fluid regulator of claim 17, wherein when the diaphragm moves toward the second chamber, the flexible element is configured to move toward the barrier to an expanded position to increase a volume of the second chamber.

19. The fluid regulator of claim 17, wherein when the diaphragm moves away from the second chamber, the flexible element is configured to move away from the barrier to a retracted position to decrease a volume of the second chamber.

20. The fluid regulator of claim 17, wherein the flexible element is configured to move toward and contact the barrier such that fluid flowing in the regulator body does not exhaust through the exhaust vent to the atmosphere.

* * * * *